US011102934B2

(12) United States Patent
Jin

(10) Patent No.: US 11,102,934 B2
(45) Date of Patent: Aug. 31, 2021

(54) SYSTEMS FOR UNBALING, SEPARATING AND DECORTIFYING FIBROUS CROPS

(71) Applicant: Shan Jin, Gilbert Plains (CA)

(72) Inventor: Shan Jin, Gilbert Plains (CA)

( * ) Notice: Subject to any disclaimer, the term of this patent is extended or adjusted under 35 U.S.C. 154(b) by 302 days.

(21) Appl. No.: 15/573,528

(22) PCT Filed: Oct. 7, 2015

(86) PCT No.: PCT/CA2015/051014
§ 371 (c)(1),
(2) Date: Nov. 13, 2017

(87) PCT Pub. No.: WO2016/179681
PCT Pub. Date: Nov. 17, 2016

(65) Prior Publication Data
US 2018/0103591 A1 Apr. 19, 2018

Related U.S. Application Data

(60) Provisional application No. 62/159,724, filed on May 11, 2015.

(51) Int. Cl.
*A01F 29/00* (2006.01)
*A01F 29/06* (2006.01)
(Continued)

(52) U.S. Cl.
CPC .......... *A01F 29/005* (2013.01); *A01D 87/127* (2013.01); *A01F 29/06* (2013.01);
(Continued)

(58) Field of Classification Search
CPC ........ A01F 29/005; A01F 29/06; A01F 29/12; A01D 87/127; A01D 2087/128; D01B 1/22; D01B 9/00; B02C 23/38; B02C 2018/147
(Continued)

(56) References Cited

U.S. PATENT DOCUMENTS 223,689 A * 1/1880 Adams ................ B01F 13/0035
2,121,378 A * 6/1938 Wilkinson ............... D01B 1/22
19/24
(Continued)

FOREIGN PATENT DOCUMENTS

DE 202005002196 U1 * 4/2005 .......... A01F 29/005
EP 2420131 A1 * 2/2012 ............. A01D 43/10
GB 1203284 A * 8/1970 ............... A23N 5/00

OTHER PUBLICATIONS

English translate (EP2420131A1), retrieved date Feb. 21, 2020.*
English translate (DE202005002196U1), retrieved date Dec. 28, 2020.*

*Primary Examiner* — Adam J Eiseman
*Assistant Examiner* — Mohammed S. Alawadi
(74) *Attorney, Agent, or Firm* — Kyle R Satterthwaite; Ryan R Dupuis; Ade & Company Inc.

(57) ABSTRACT

Processing of baled material includes a bale opening stage, a separation stage, and a decortication stage. The bale opener features a conveyor moving incoming bales toward a toothed extractor with an array of teeth driven on a revolutionary path moving upwardly past the adjacent end of the conveyor to rake through the bale and extract material therefrom. The conveyor tilts upward reduce a working angle between the conveyor and the toothed extractor to urge the shrinking bale toward the moving teeth. A separation stage features multiple sets of vertically stacked, counter-rotating rollers with different characteristics from one set to the next. A decorticator has an external container, an internal drum rotatably supported therein, and an array of teeth on the drum. Driven rotation of the internal drum spins the fibrous stalks around the internal drum and impacts the fibrous stalks against surrounding interior wall surfaces of the external container.

14 Claims, 10 Drawing Sheets

(51) Int. Cl.
*A01F 29/12* (2006.01)
*B02C 23/38* (2006.01)
*A01D 87/12* (2006.01)
*B02C 18/14* (2006.01)
*D01B 1/22* (2006.01)

(52) U.S. Cl.
CPC .............. *A01F 29/12* (2013.01); *B02C 23/38* (2013.01); *A01D 2087/128* (2013.01); *B02C 2018/147* (2013.01); *D01B 1/22* (2013.01)

(58) Field of Classification Search
USPC .......................... 241/101.2, 152.2, 157, 147
See application file for complete search history.

(56) References Cited

U.S. PATENT DOCUMENTS

| | | | | |
|---|---|---|---|---|
| 2,231,040 | A * | 2/1941 | Wessel .................... | D01B 9/00 19/5 R |
| 5,447,276 | A * | 9/1995 | Aldridge ................. | D01B 1/14 241/79 |
| 6,079,647 | A * | 6/2000 | Leduc ..................... | D01B 1/16 19/24 |
| 6,539,585 | B1 * | 4/2003 | Anthony ................. | D01B 1/04 19/39 |
| 6,547,173 | B1 * | 4/2003 | von Rotenhan ........ | A23N 5/00 241/246 |

\* cited by examiner

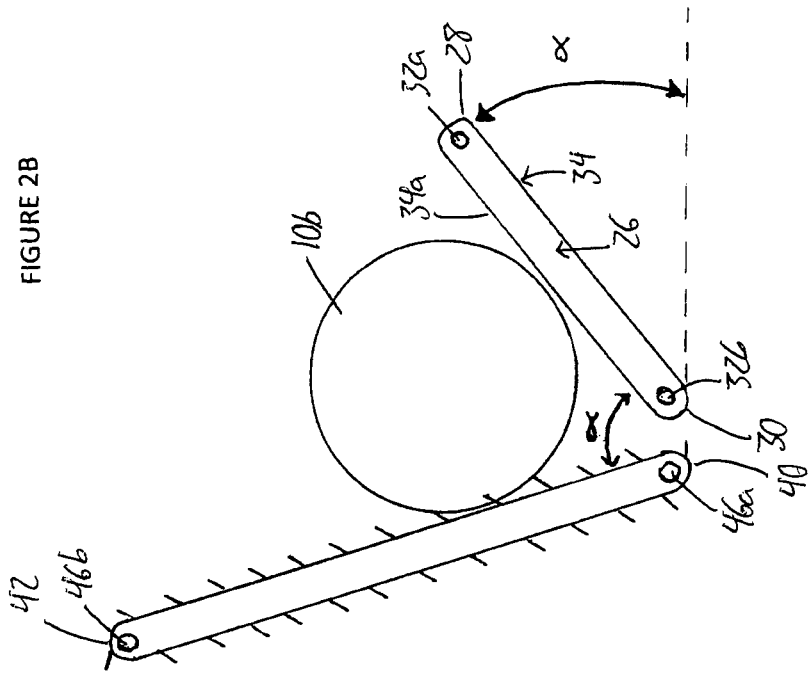
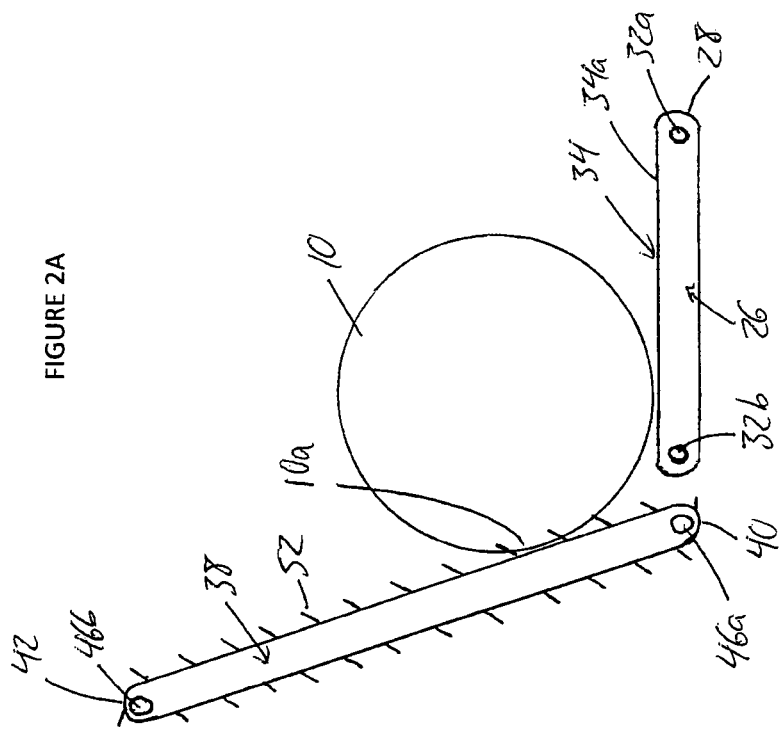

SYSTEMS FOR UNBALING, SEPARATING AND DECORTIFYING FIBROUS CROPS

This application is the national stage of PCT/CA2015/051,014, filed Oct. 7, 2015, and claims benefit under 35 U.S.C. 119(e) of U.S. Provisional Application Ser. No. 62/159,724, filed May 11, 2015.

FIELD OF THE INVENTION

The present invention relates generally to systems for processing of baled fibrous crops, such as hemp, and more particularly to systems that extract the stalks from their initially baled state, separate the outer fibres from the inner cores of the stalks, and remove the hurds (core remnants) from the separated fibres.

BACKGROUND

It is long established practice to form harvested agricultural and industrial crops into compact bales that are easier and more efficient to handle, transport and store than loose stalks of harvest crop material. However, this leads to the need for effective machinery for subsequently breaking down the bales and processing the unbaled stalks to obtain useful commodities from same.

Applicant has developed a unique solution for the processing of baled industrial hemp to obtain thoroughly separated hemp fibers and hurds, which have several useful applications in industry.

SUMMARY OF THE INVENTION

According to a first aspect of the invention, there is provided a system for processing baled material, the system comprising:

a belt conveyor comprising a belt entrained about a set of rollers, the belt conveyor having a proximal end and an opposing distal end spaced apart in a working direction of the conveyor, the conveyor being arranged to receive a bale of material on a topside of the conveyor and operable to convey the bale of material toward the distal end of the conveyor; and a toothed extractor disposed adjacent to the distal end of the belt conveyor, the toothed extractor comprising a carrier entrained about a set of rotatable members for driven movement of the carrier on a revolutionary path about the set of rotatable members and an array of teeth mounted to the carrier for movement therewith on the revolutionary path, the rotatable members of the toothed extractor having rotational axes that lie parallel to the rollers of the belt conveyor and the revolutionary path of the carrier including a working segment facing toward the belt conveyor and extending upwardly away from the distal end thereof;

whereby upwardly driven movement of the teeth proximate the distal end of the belt conveyor at the working segment of the toothed extractor extracts stalk material from the bale on the conveyor belt.

Preferably the belt conveyor and toothed extractor are movable relative to one another in opposing directions about a pivot axis, which lies parallel to the rollers and the rotational axes, to vary a working angle measured between the topside of the belt conveyor and the working segment of the toothed extractor.

Preferably the proximal end of the belt conveyor is raisable and lowerable relative to the distal end thereof to vary the working angle.

Preferably the carrier of the toothed extractor comprises a plurality of bars each lying parallel to the rollers and the rotational axes, each bar comprising a plurality of teeth mounted thereon.

Preferably the teeth are obliquely oriented relative to the carrier in planes normal to the rotational axes, each tooth being disposed at an acute angle relative to the carrier on a leading side of the tooth that faces upwardly at the working segment of the revolutionary path.

Preferably the acute angle is between 20 and 30 degrees, inclusive.

Preferably the array of teeth comprises groups of three teeth and the three teeth of each group, when at the working segment of the revolutionary path, reside at corners of a respective isosceles triangle in a plane of the working segment, with a base of the triangle lying parallel to the rotational axes and two equal-length sides of the triangle converging upwardly toward an apex of the revolutionary path.

Preferably an interior angle between the equal-length sides of each isosceles triangle is between 40 and 60 degrees, inclusive.

Preferably each tooth comprises a conically pointed tip.

Preferably there is provided a peeling roller positioned adjacent to the working segment of the revolutionary path of the toothed extractor at an elevation spaced upwardly from the belt conveyor, the peeling roller being rotatable in a direction matching the revolutionary path of the toothed extractor and comprising outward projections on a periphery of the roller for peeling tangled stalk from the toothed extractor.

Preferably there is provided a pair of side-by-side counter-rotating rollers lying parallel to the rotational axes and positioned alongside one another below an output of the toothed material extractor to receive falling material from the toothed material extractor into a space between the counter rotating rollers.

Preferably the pair of side-by-side counter-rotating rollers comprises a smooth roller and a bar roller.

Preferably the bar roller is positioned nearer to the toothed material extractor than the smooth roller.

Preferably the bar roller is positioned sufficiently proximate the toothed extractor to extract remnant material from the toothed extractor at a return-segment of the revolutionary path that lies opposite to the working segment.

Preferably the bar roller comprises triangular bars on the periphery thereof.

Preferably the bar roller has a staggered bar pattern in which each bar spans less than a full axial length of the roller, and adjacent bars are offset from one another around a circumference of the roller.

Preferably there is provided a discharge conveyor disposed below the space between the side-by-side counter-rotating rollers and extending outwardly from under the counter-rotating rollers away from the toothed extractor to convey material away from the counter-rotating rollers.

Preferably a roller-based material separation stage situated in a downstream direction from the toothed material extractor, the material separation stage comprising at least one set of vertically-stacked counter-rotating rollers, each set of vertically-stacked counter-rotating rollers comprising at least one respective pair of vertically-stacked counter-rotating rollers having nip therebetween through which stalk material from the toothed extractor is conveyed.

Preferably the at least one set of vertically-stacked counter-rotating rollers comprise multiple sets of vertically-stacked counter-rotating rollers, the counter-rotating rollers varying in one or more physical characteristics from one set to the next.

Preferably the one or more physical characteristics include an indentation depth between adjacent protrusions at a periphery of each vertically-stacked counter-rotating roller.

Preferably, for at least one pair of said multiple sets of vertically-stacked counter-rotating rollers, the indentation depth increases in the downstream direction from one set of vertically-stacked counter-rotating rollers to another.

Preferably the one or more physical characteristics include a sharpness of peaked areas around a circumference of each vertically-stacked counter-rotating roller.

Preferably, for at least one pair of said multiple sets of vertically-stacked counter-rotating rollers, the sharpness increases in the downstream direction moving from one set of vertically-stacked counter-rotating rollers to another.

Preferably the one or more physical characteristics include a peripheral pattern of each vertically-stacked counter-rotating roller.

Preferably the multiple sets of vertically-stacked counter-rotating rollers comprise axially and helically configured sets of vertically stacked counter-rotating rollers.

Preferably the multiple sets of vertically-stacked counter-rotating rollers comprise a left-hand helically configured set of vertically-stacked counter-rotating rollers and a right-hand helically configured set of vertically-stacked counter-rotating rollers.

Preferably there is provided a decortication stage situated downstream of the roller-based material separation stage, the decortication stage comprising:
  at least one decorticator comprising:
  an external container;
  an internal drum rotatably supported within the external container and coupled to a drive source for driven rotation of the internal drum about a longitudinal axis thereof;
  an array of teeth mounted to a periphery of the drum; and
  an intake opening on the external container to accommodate receipt of fibrous stalks within a hollow interior of the external container, whereupon driven rotation of the internal drum and the array of teeth thereon spins the fibrous stalks around the internal drum and impacts the fibrous stalks against surrounding interior wall surfaces of the external container.

Preferably the array of teeth have a helical layout on the periphery of the internal drum.

Preferably the hollow interior of the external container has a cylindrical shape, and the drum lies concentrically of the cylindrical shape of the hollow interior.

Preferably:
  the at least one decorticator comprises first and second decorticators;
  the external housing of the first decorticator comprises a hurd outlet and a first filter that is configured to allow hurds to exit the external housing of the first decorticator through the hurd outlet while preventing fibers from exiting therethrough; and
  the external housing of the first decorticator has a separate fiber outlet that feeds into the intake opening of the second decorticator to transfer fibers of the fibrous stalks to the second decorticator.

Preferably the hurd outlet is at an underside of the external housing of the first decorticator, the separate fiber outlet is located at a side thereof, and the intake opening of the external housing of the second decorticator is located at a side thereof.

Preferably the external housing of the second decorticator comprises:
  comprises a short fiber outlet and a second filter that is configured to allow short fibers to exit the external housing of the second decorticator through the short fiber outlet while preventing long fibers from exiting therethrough; and
  a separate long fiber outlet through which the long fibers exit the external housing of the second decorticator.

Preferably each filter comprises a grating.

Preferably the grating comprises a series of bars welded to end walls of the respective external container and lying parallel to one another along a longitudinal axis of the hollow interior of the respective external container.

According to a second aspect of the invention, there is provided a system for processing fibrous crop material, the system comprising a roller-based material separation stage for separating fibers from stalks of fibrous crop material, the roller-based material separation stage comprising a roller-based material separation stage which comprises at least one set of vertically-stacked counter-rotating rollers, each set of vertically-stacked counter-rotating rollers comprising at least one respective pair of vertically-stacked counter-rotating rollers having nip therebetween through which stalk material from the toothed extractor is conveyed.

According to a third aspect of the invention, there is provided a system for processing fibrous crop material, the system comprising a decortication stage which comprises:
  at least one decorticator comprising:
  an external container;
  an internal drum rotatably supported within the external container and coupled to a drive source for driven rotation of the internal drum about a longitudinal axis thereof;
  an array of teeth mounted to a periphery of the drum; and
  an intake opening on the external container to accommodate receipt of fibrous stalks within a hollow interior of the external container, whereupon driven rotation of the internal drum and the array of teeth thereon spins the fibrous stalks around the internal drum and impacts the fibrous stalks against surrounding interior wall surfaces of the external container.

BRIEF DESCRIPTION OF THE DRAWINGS

One embodiment of the invention will now be described in conjunction with the accompanying drawings in which:

FIG. 2A is a schematic closeup side view of an extraction station of the bale opening stage of FIG. 1 in an initial state accommodating receipt of a fully intact bale from an upstream intake conveyor.

FIG. 2B is a schematic close-up side view of the extraction station of FIG. 2A in a subsequent state continuing to process the bale, the size of which has accordingly been reduced by ongoing extraction of unprocessed stalks therefrom.

In the drawings like characters of reference indicate corresponding parts in the different figures.

DETAILED DESCRIPTION

Figure 1:
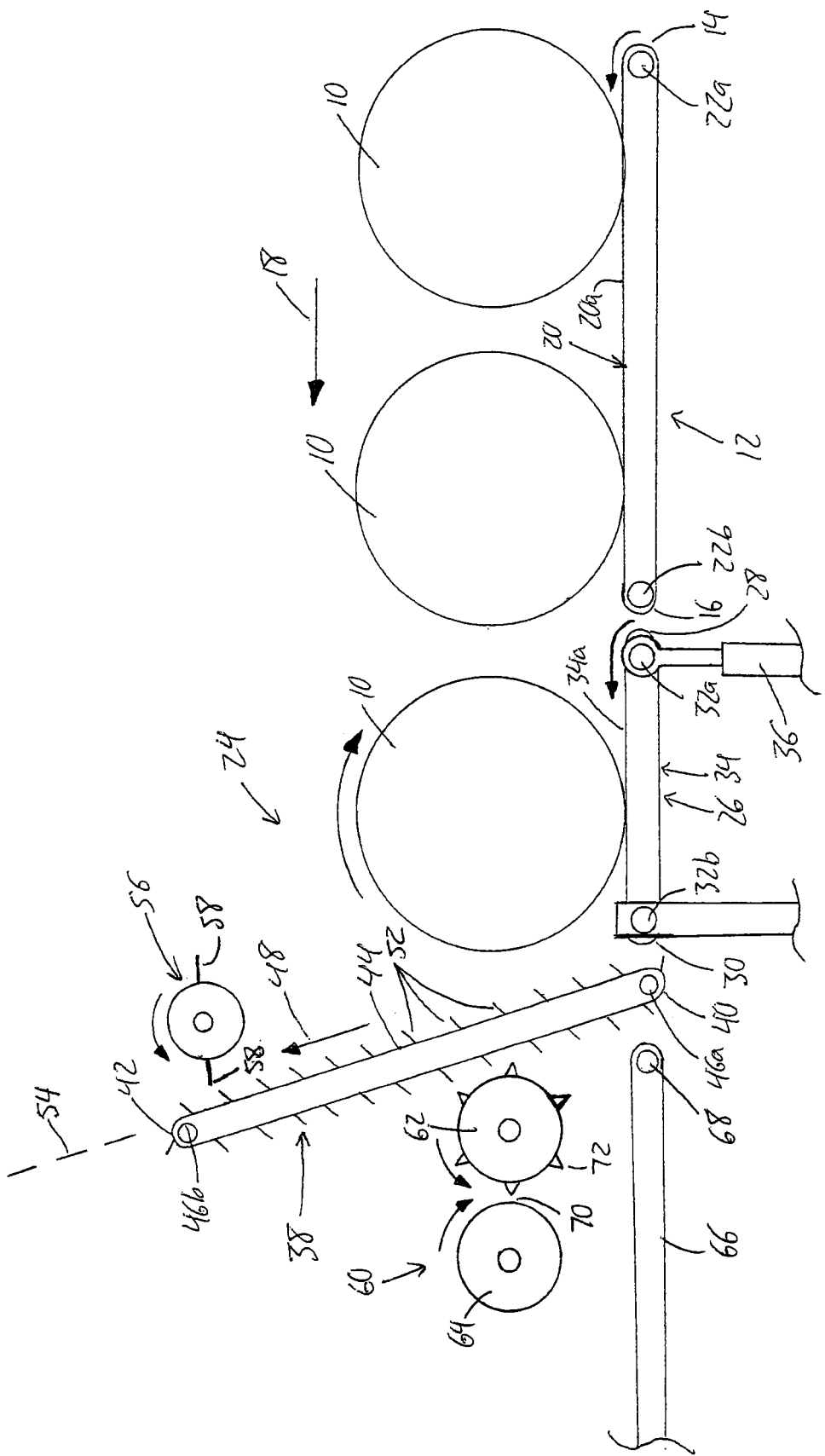
FIG. 1 is a schematic side view of a bale opening stage of an industrial hemp processing system of the present invention.

FIG. 1 shows a first stage of a hemp processing plant of the present invention which processes incoming bales of hemp to extract useful hemp fibers and hurds to enable use of these commodities for the production of various commercial goods. The first stage illustrated in FIG. 1 is a bale opening stage in which the incoming help bales are broken down in order to separate the baled hemp stalks from one another for further processing thereof in subsequent stages of the plant process.

Incoming bales 10 of a fully intact initial size are loaded onto a horizontally oriented belt-type intake conveyor 12. In one embodiment, this hemp bale intake conveyor 12 is 80 cm high from the ground, 200 cm wide and 600 cm long. After each individual hemp bale 10 is placed on the intake conveyor 12, the twines are cut and removed from the bale, whether by a human operator or by some automated removal mechanism. The intake conveyor 12 features a proximal intake end 14 at which each bale is initially received, and an opposing distal end 16 horizontally spaced from the intake end 14 in a downstream direction 18. As a conventional belt conveyor, the belt 20 of the intake conveyor 12 is entrained about a set of rollers, including a pair of rollers 22a, 22b at the opposing ends of the conveyor, one of which is rotatably driven by a suitable motor (not shown) to effect revolution of the belt 20 about the collective set of rollers in a direction by which the topside 20a of the belt moves in the downstream direction 16. Accordingly, each bale 10 placed atop the belt 20 is conveyed in the downstream direction 16 toward a bale opening station 24 situated adjacent the distal end 16 of the intake conveyor 12.

A first component of the bale opening station 24 is a material distributor featuring another belt conveyor 26 that again has a respective proximal end 28 and an opposing distal end 30 that is spaced from the proximal end 28 in the downstream direction 18. The proximal end 28 of the material distribution conveyor 26 resides adjacent to the distal end 16 of the intake conveyor in the downstream direction 18. A first roller 32a at the proximal end 28 and a second roller 32b at the distal end 30 again fully or partially define a set of rollers about which the belt 34 of the conveyor 26 is entrained. Driven rotation of one of the rollers in a predetermined direction (counter-clockwise in FIG. 1) by a suitable motor causes the topside 34a of the belt 34 to move from the proximal end 28 to the opposing distal end 30 so as to convey a bale 10 further downstream toward a canted tooth board that defines a second component of the bale opening station 24. In the illustrated embodiment, the horizontal rollers of the intake and material distribution conveyors lie parallel to one another so that the two horizontal conveyors share the same longitudinal conveyance direction in which the hemp bales 10 are conveyed downstream.

Whereas the intake conveyor 12 is fixed in a horizontal position so that its two ends always reside in the same horizontal plane, the material distribution conveyor 26 is movable in position. Specifically, the proximal end 28 thereof can be raised and lowered relative to the distal end 30 thereof, for example using one or more hydraulic linear actuators coupled between the proximal end roller 32a and a stationary reference frame (e.g. a fixture mounted to a ground area beneath the material distribution conveyor 26). The illustrated embodiment shows one such hydraulic linear actuator 36 whose piston rod is pivotally coupled to an axle of the proximal end roller 32a at one end thereof, and whose cylinder is pivotally coupled to a stationary reference frame below the conveyor 26. A second such actuator may be likewise connected at the opposing end of the proximal end roller's axle on the other side of the belt 34 to ensure uniform lifting at both sides of the conveyor 26. Each hydraulic actuator 36 may feature a single acting cylinder, for example using hydraulic pressure to raise the proximal end 28 of the conveyor while relying on gravity, and optionally a return spring, to lower the proximal end 28 back down. Alternatively, a double acting cylinder employing pressurized hydraulic fluid in both directions may be used. In its lowered position, shown in FIG. 1 and FIG. 2A, the intake end 28 of the material distribution conveyor 26 resides in the same horizontal plane as the distal end 30 thereof, thereby achieving a horizontal orientation of the conveyor 26. In one embodiment, the material distribution conveyor 26 resides 80 cm above the ground in its horizontal position and is 200 cm wide and 200 cm long.

The canted tooth board 38 at the second part of the bale opening station 24 has a lower end 40 residing next to the distal end 30 of the material distribution conveyor 26, and an opposing upper end 42 spaced vertically above the lower end and offset horizontally therefrom in the downstream direction 18, whereby the tooth board 28 is canted or inclined so as to angle upwardly away from the distal end 30 of the material distribution conveyor 26. The canted tooth board 30 features a chain conveyor 44 having one or more chains entrained about a set of rotatable members, including a pair of rotatable members 46a, 46b disposed respectively at the lower and upper ends of the tooth board 38. As in a conventional chain conveyor, each rotatable member features one or more sockets mounted on a rotatable shaft, and a respective chain is entrained about one of these sprockets and a corresponding sprocket on the other rotatable member. Driven rotation of one of the sprockets in a predetermined direction (counter-clockwise in FIG. 1) drives revolution of the chains 44 around the set of rotatable member in a direction such that the chains move upward and downstream on a working side of the tooth board 38 that faces toward the material distribution conveyor 26, as shown by arrow 48. In one embodiment, the tooth board 38 is 200 cm in width, and 300 cm in height.

Figure 3A:
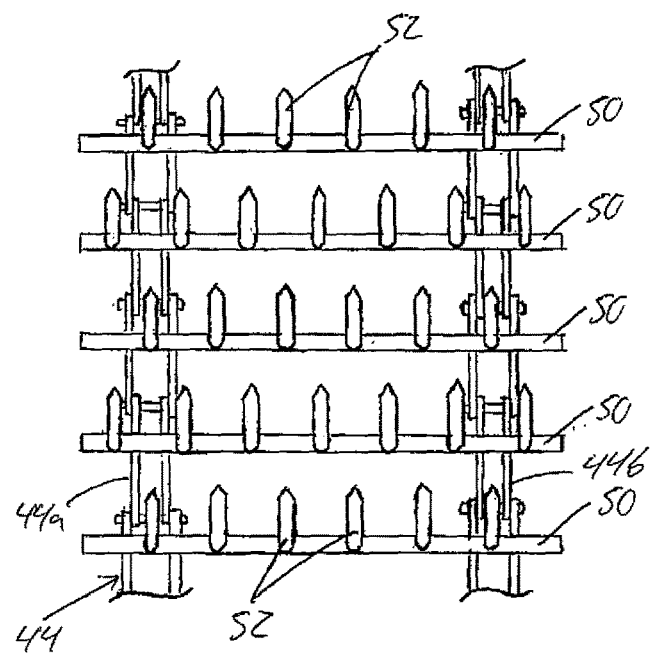
FIG. 3A is a schematic close-up front view of a canted tooth board of the extraction station of FIG. 2, which extracts the unprocessed stalks from the bale.
Figure 3B:
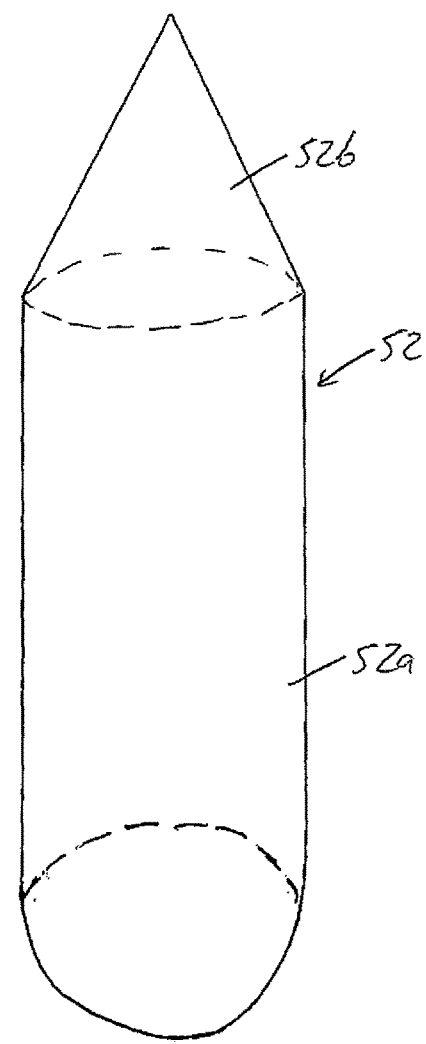
FIG. 3B shows an individual tooth from the canted teeth board of FIG. 3A.

The rotatable members 46a, 46b of the tooth board 38 lie parallel to the rollers of the intake and material distribution conveyors 16, 26, with the revolutionary path of the chain conveyor 44 thus residing in a vertical plane normal to the horizontal axes of the rotatable members and rollers. Turning to FIG. 3, several rows of horizontal steel bars 50 are welded to the chain conveyor 44 at regularly spaced intervals therealong, each steel bar lying parallel to the rotatable members 46a, 46b so as to cross the one or more chains of the chain conveyor 44, which in FIG. 3A is shown as having two chains 44a, 44b. In one embodiment, each steel bar is 200 cm long (as measured parallel to the width direction of the conveyors), and 5 cm high (as measured by its protrusion from the underlying chains 44a, 44b). A plurality of canted teeth 52 are welded onto each still bar at regularly spaced intervals therealong. In one embodiment, the teeth are each 10 cm long, and are spaced 10 cm apart from one another along the bar 50. Each tooth of the illustrated embodiment extends linearly in a longitudinal direction of the tooth, is circular in profile in cross-sectional planes lying normal to the longitudinal direction, and has a cylindrical shape at a mounting portion 52a of the tooth and a conical shape 52b at a pointed tip thereof. The chain conveyor 44 and attached bars 50 form a carrier by which the array of teeth are driven on a predetermined path around the set of rotatable members.

Figure 3C:
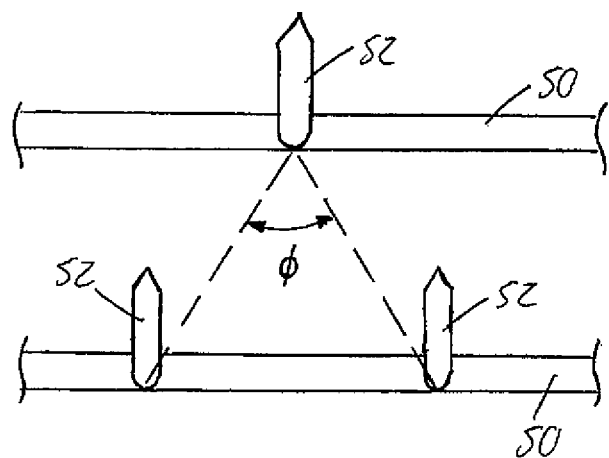
FIG. 3C schematically illustrates a triangular layout of the teeth of the canted teeth board of FIG. 3A.
Figure 3D:
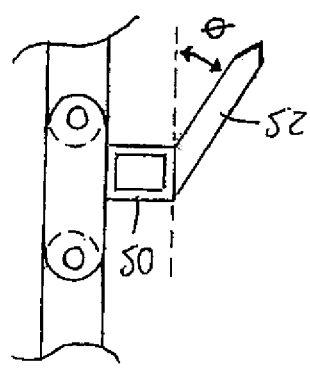
FIG. 3D schematically illustrates an angled position of each tooth relative to a carrier on which it is mounted.
Figure 4:
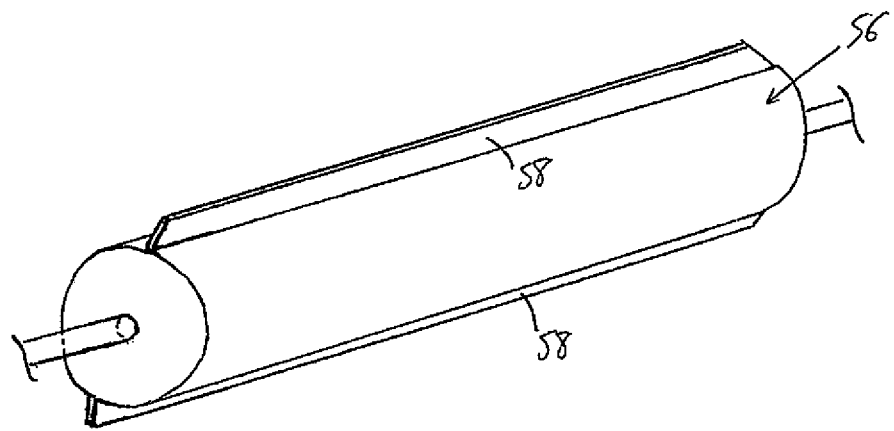
FIG. 4 is a schematic perspective view of a peeling roller of FIG. 1, which is co-operable with the canted teeth board of the extraction apparatus.

As shown in FIG. 3D, each tooth 52 is disposed at an oblique angle $\theta$ relative to the bar 50 on which it is mounted. With reference to FIG. 1, the bars 50 reside an inclined plane 54 when at the working segment of the moving path of the conveyor chain 44, and each tooth 52 at the working segment lies at the oblique angle $\theta$ relative to this plane 54 of the bars 50. The oblique angle $\theta$ is measured on the leading side of the tooth, i.e. the side thereof that faces upwardly and downstream as the tooth traverses the working segment of the chain conveyors path around the rotatable members 46a, 46b. The oblique angle $\theta$ is acute, for example with an optimal value of 25-degrees in one embodiment, and a value between 20 and 30-degrees in other embodiments.

With reference to FIG. 3C, the teeth 52 are laid out in sets of three that, when riding up the inclined plane 54 of the working segment of the chain conveyor's revolutionary path, occupy a triangular pattern in which the three teeth 52 resides at respective corners of an isosceles triangle, with two of these teeth on one of the steel bars 50, and the third of these teeth residing on the next steel bar further up the inclined plane of the working segment. In one particularly preferable embodiment, the inside angle $\phi$ of the isosceles triangle at the upper point thereof is 50-degrees. In other embodiments, the angle may vary between 40 and 60-degrees.

Like the intake conveyor 12, but unlike the movable material distribution conveyor 26, the tooth board 38 resides in a fixed position during use, whereby a lack of movement between the positions of the rotatable members 46a, 46b at the lower and upper ends 40, 42 of the tooth board 38 maintains the same canted or inclined position of the tooth board in close proximity to, but no contact with, the material distribution conveyor 26.

FIG. 1 shows the bale opening station 24 in a default initial state ready for receipt of a bale 10 at the proximal end 28 thereof from the distal end 16 of the intake conveyor 12. In this initial state, the material distribution conveyor 26 is in its horizontal position, and the belt 34 of the material distribution conveyor is driven in the predetermined direction to urge the bale 10 toward the canted tooth board 38. Turning to FIG. 2A, the chain conveyor 44 of the tooth board 38 is simultaneously driven in the predetermined direction, whereby the teeth 52 riding up the working segment of the conveyor path on the front side of the tooth board are driven upwardly through a peripheral area 10a of the bale 10 at the side thereof that faces the tooth board 38. The moving teeth thus extract stalks of hemp from the bale 10, and the draw the same upwardly along the front side of the tooth board and over the upper end 42 thereof. As material is extracted from the bale 10, the bale becomes smaller in diameter. Turning to FIG. 2, during this extraction of material and corresponding decrease in bale size, the proximal end 28 of the material distribution conveyor 26 is raised, for example by extending the hydraulic cylinder 36, thereby moving the material distribution conveyor into an angled position that is inclined in a direction opposite the tooth board 38. This decreases an angle $\alpha$ measured between the topside 34a of the distribution conveyor belt 34 and the front side working segment of the tooth board 38. The angled position of the material distribution conveyor gravitationally urges the smaller bale 10b toward the intersection of the planes of the material distribution conveyor and the tooth board, while the movement of the material distribution conveyor toward the tooth board urges the smaller bale 10a into contact with the tooth board 38 at a higher position elevated from the lower end of the tooth board along the front side working segment thereof.

The bale continues to reduce in size under the action of the tooth board. Once the bale has been entirely broken down, the proximal end of the material distribution conveyor is lowered back down, for example under the collapse of hydraulic actuator 36, to return the material distribution conveyor to its default horizontal position, in which it is ready to accept the next bale 10 from the intake conveyor 12.

A third component of the bale opening station 24 is a peeling roller 56 positioned adjacent to the front side working segment of the tooth board 38 at an elevated height from the material distribution conveyor 26 near the upper end 42 of the tooth board 38. The peeling roller 56 rotates on an axis parallel to the rollers of the belt conveyors 12, 26 and to the rotatable members of the tooth board 38. In one embodiment, the peeling roller is 50 cm in diameter and 200 cm in width. Having the same width as the tooth board 38, the peeling roller acts over the full width of the tooth board. Two axially-extending metal strips or fins are welded symmetrically on both sides of the roller, thereby forming a pair of outward radial projections 58 at diametrically opposing points on the periphery of the roller. The roller is driven for rotation about its axis in the same direction as the revolutionary path of the chain conveyor 44 about the set of rotatable members, i.e. counter-clockwise in FIG. 1. The projections 58 on the roller pass in close proximity to the teeth 52 at the front side working segment of the tooth board 38, whereby the driven rotation of the peeling roller peels extra feedstock from the tooth board 38. The peeling roller prevents tangled hemp stalk from passing into the next step of the process, which may otherwise effect or compromise the purity of the final product(s).

Figure 5A:
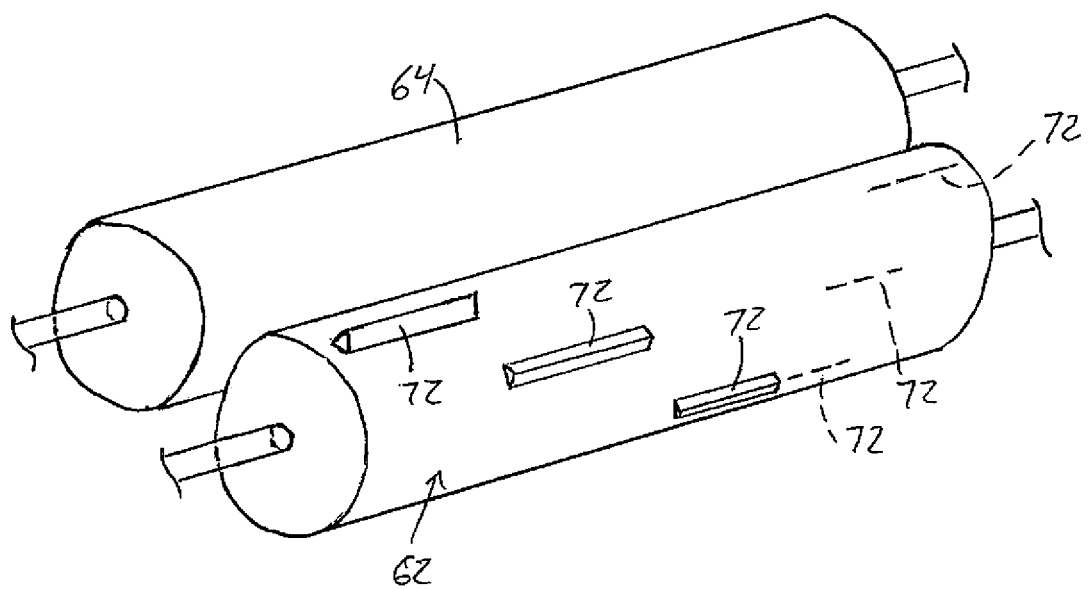
FIG. 5A is a schematic front perspective view of a refining section of the bale opening stage of FIG. 1, which features a smooth roller in side-by-side counter-rotating relation to a bar roller to act on material falling therebetween from the canted teeth board of the extraction section.
Figure 5:
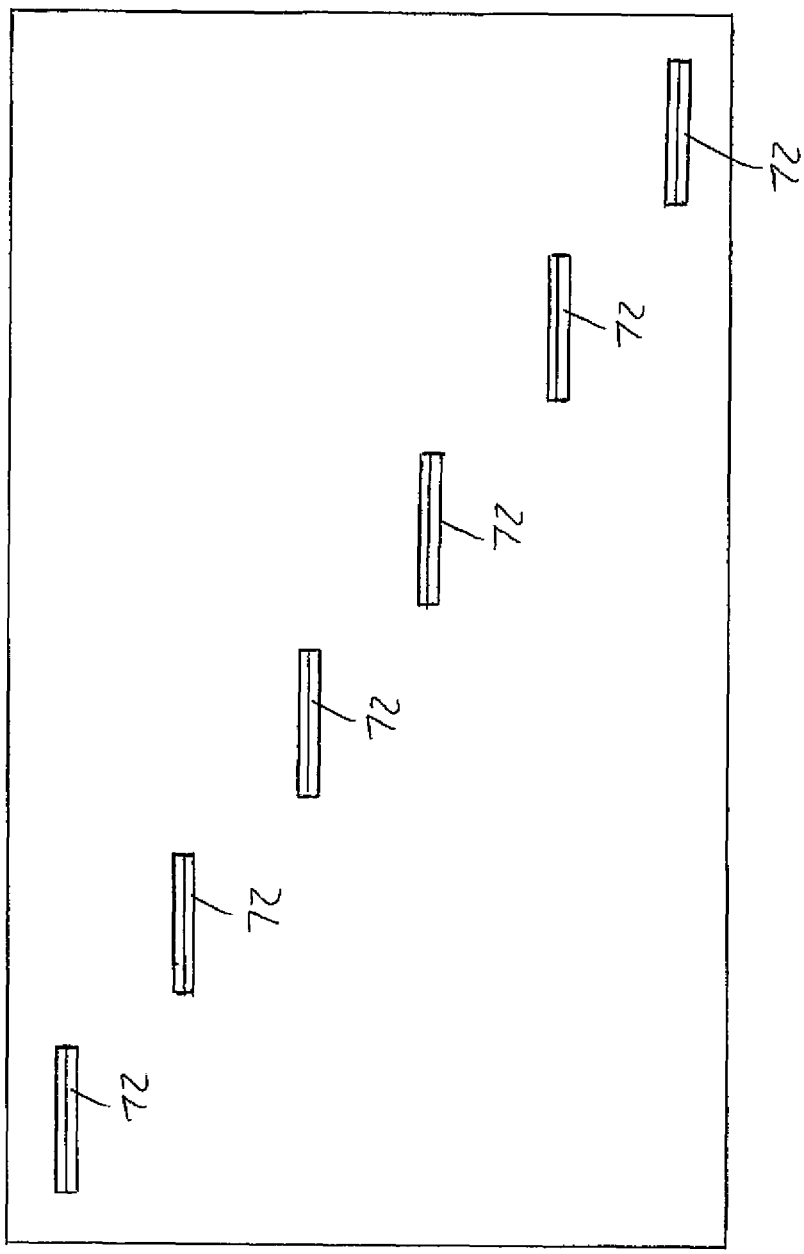
FIG. 5B is a schematic front elevational view of the rib layout of FIG. 5B as it would appear on a flat plate prior to roll forming thereof into a cylindrical drum of the roller.

A fourth component of the bale opening stage of FIG. 1 is a refining station or device 60, which features a pair of horizontally-adjacent counter-rotating rollers 62, 64 residing next to the tooth board 38 in the shadow thereof, i.e. at a downstream or rear side thereof that lies opposite to the front side working segment. A discharge belt conveyor 66 resides beneath the two counter-rotating rollers 62, 64 and extends horizontally outward from thereunder in the downstream direction 18 from a proximal end 68 of the discharge belt conveyor 66 situated adjacent the lower end 40 of the tooth board 38 toward an opposing distal end of the discharge belt conveyor 66 (not shown). The first roller 62 that resides closer to the tooth board 38 is a bar-equipped or ribbed roller, while the second roller 64 situated downstream of the first is a smooth roller. In one embodiment, each roller 62, 64 is 50 cm in diameter. The bar roller 62 features a plurality of axially-extending bars 72 welded to the periphery of the roller at evenly spaced positions around the circumference thereof. With reference to FIGS. 5A and 5B, each bar 72 is shorter in length than the drum of the roller 62, and thus spans only a partial axial length of the drum. The bars 72 are staggered or offset from one another in the axial direction of the roller so as to span different fractional portions of the roller's axial length. Together with the even angular spacing of the bars around the circumference of the roller, the result is a helical layout of the bars on the completed roller.

In one embodiment, there are six bars 72 on the ribbed roller. The bars 72 are triangular in cross-section, and in one embodiment are 30 cm wide and 10 cm high, with the width referring the base of the triangular bar that is mounted to the circumference of the roller, and the height referring to the radial extent of the bar from its base to its pointed outer tip. The space or nip 70 between the rollers 62, 64 of the refining station 60 is aligned below the output of the tooth board 38 at the upper end thereof so that falling stalks from the tooth board can pass through this space or nip. Thus, the rollers 62, 64 can control the volume of material falling onto the discharge conveyor 66 below. The refining rollers 62, 64 are driven in opposite directions by which the facing-together sides of the refining rollers 62, 64 move downwardly through the space or nip 70 between them. Accordingly, in FIG. 1, the bar roller 62 rotates counter-clockwise, while the smooth roller 64 rotates clockwise. The bar roller 62 is positioned in close proximity to the teeth 52 at the rear side of the tooth board 38, and thereby can extract remnant stalk material therefrom that was not released from the teeth 52 at the apex of the board 38. The discharge conveyor 66 conveys the material from the refining rollers 62, 64 to a downstream decortication stage The equipment in the bale opening stage can work continuously, reducing the feeding time and enhancing the efficiency of opening the bale. That is, the intake conveyor, material distributor conveyor, tooth board, peeling roller, refining rollers and discharge roller can all be run simultaneously on an ongoing continual basis, whereby as one bale is opened at the extraction station 24 through the revolution of the tooth board 38 and tilting action of the material distribution conveyor, the next bale is gradually conveyed toward the extraction station 24 by the intake conveyor so as to arrive at same once the first bale has been fully broken down and the material distribution conveyor has been lowered back into its horizontal ready position.

Figure 6:
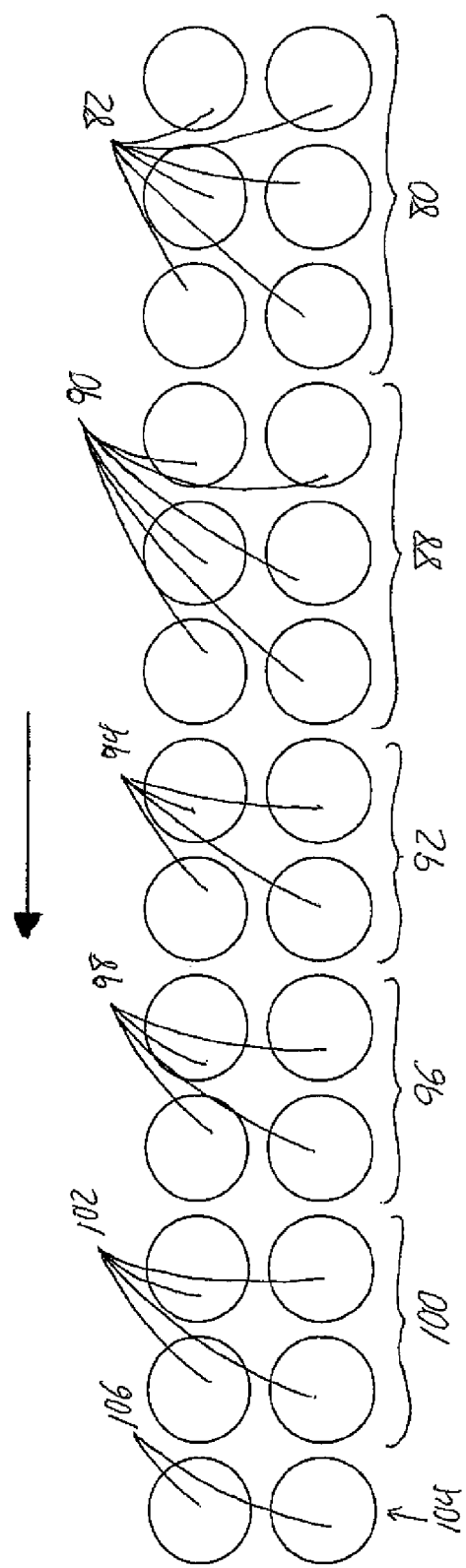
FIG. 6 is a schematic side elevational view of a separation stage of the industrial hemp processing system of the present invention, which is located downstream of the bale opening stage of FIG. 1 and feature multiple sets of vertically stacked rollers of different configuration.
Figure 9:
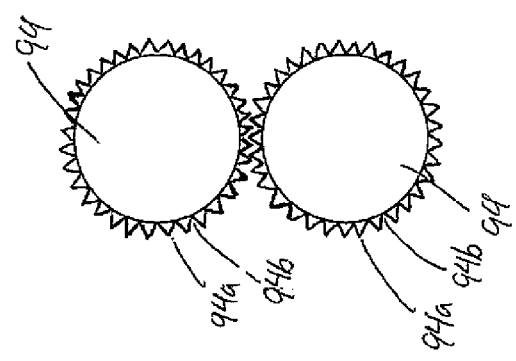
FIG. 9 is a schematic side elevational view a second folding section of the separation stage of FIG. 6, which is located downstream of the first folding section of FIG. 8 features even deeper indentations and even sharper teeth.

FIG. 6 schematically illustrates a second stage of the hemp processing plant, which is referred to herein as a separation stage in which stalks extracted from the bale by the extraction station 24 and spread evenly on the discharge conveyor 66 by the refining device 60 are pressed, folded and crumpled by a crumple machine of the separation stage. The crumple machine features thirteen pairs of vertically stacked counter-rotating rollers. In each pair, the two rollers are vertically stacked, in that the axis of one roller is situated at a greater elevation than the other so that the higher roller at least partially overlies the other. A nip is defined between the two rollers for passage of the stalks through the nip during driven counter-rotation of the rollers. The action of the rollers on the stalks separates the long fibers of the hemp from the inner cores of the stalks, which are crumpled and broken into useful hurds. In the illustrated embodiment, the axes of the two rollers in each pair are in the same vertical plane, i.e. one roller is aligned directly over the other, and the resulting conveyance of the hemp stalks is in a horizontal direction, and the axes of the rollers may be parallel to the rotational axes of the bale opening stage so that the downstream direction of the material moving through the first two stages remains the same. However, it will be appreciated that the action exerted on the stalks by each roller pair could also be achieved with other roller orientations.

Figure 7:
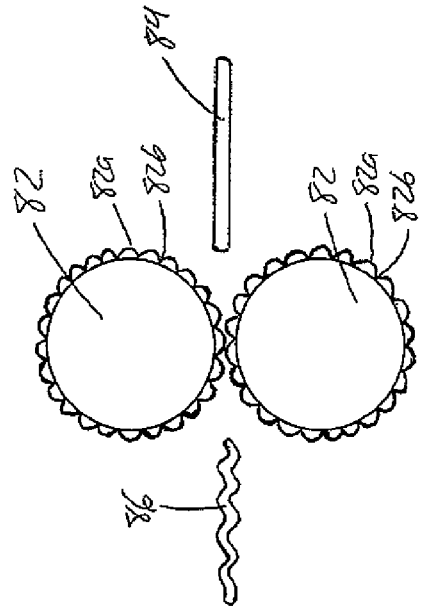
FIG. 7 is a schematic side elevational view of a pressing section of the separation stage of FIG. 6, featuring shallow indentations and rounded teeth at the periphery of the vertically stacked rollers.

A first three pairs of vertically stacked rollers define a pressing station 80. With reference to FIG. 7, the pressing rollers 82 each have a gear-like cross-sectional shape in which a plurality of protrusions at the circumference of the roller are separated by indentations or recesses. The protrusions and indentations span the axial length of each roller in a linear fashion. The protrusions 82a of the pressing rollers are relatively large in their individual spans around the roller circumference, and are notably rounded in shape, each having a gradual curve, for example of generally arcuate or semi-circular form. On the contrary, the indentations 82b between the protrusions are relatively shallow. The three pairs of pressing rollers act to press the stalks, forcing the same to move along a wave-like path. The large rounded profile of the protrusions minimize damage to the hemp fibers, while flattening the round stem of the hemp stalk at pinched points pressed between the protrusions of the pressing rollers and folding the inner core of the stem gradually due to the rounded curvature of these protrusions. So the hemp stalk enters the pressing station 80 in a generally straight, natural form 84, and exits with a generally wavy shape 86.

Figure 8:
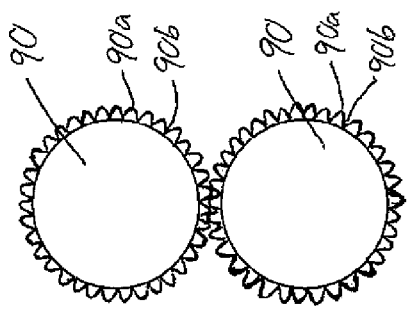
FIG. 8 is a schematic side elevational view a first folding section of the separation stage of FIG. 6, which is located downstream of the pressing section of FIG. 7 and features deeper indentations and less rounded teeth.

The next three pairs of vertically stacked rollers, i.e. the fourth to sixth pairs, define a folding station 88 and again feature axially linear protrusions circumferentially separated from one another by indentations. At this station, the folding rollers 90 feature deeper indentations than those of the pressing rollers 82, whereby the inner core of the stems are further folded and broken. With reference to FIG. 8, the protrusions 90a feature a generally parabolic or bell-shaped curvature profile having a sharper or more pronounced tip than the rounded protrusions 82a of the pressing rollers 82.

Figure 10:
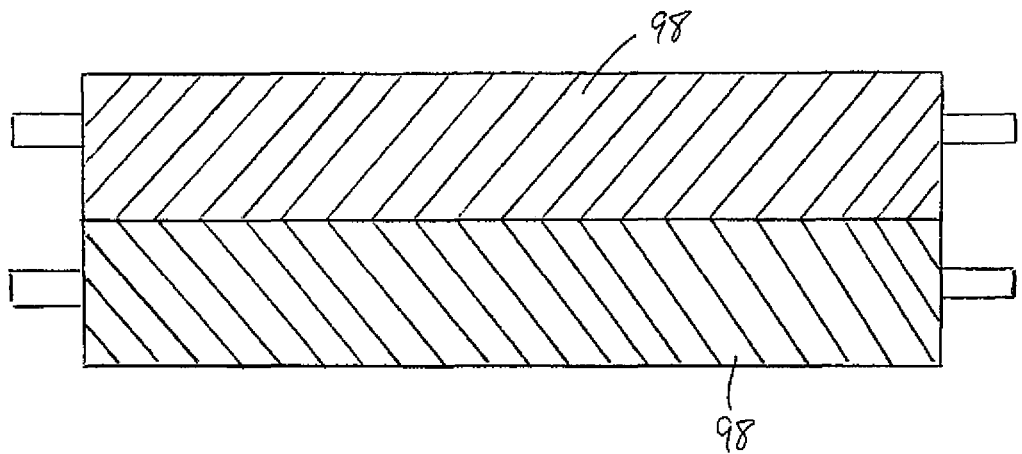
FIG. 10 is a schematic front elevational view of a first helically ribbed roller section of the separation stage of FIG. 6, which is located downstream of the second folding section of FIG. 9.

The next two pairs of vertically stacked rollers, i.e. the seventh and eighth pairs, define a deeper folding station 92 at which the rollers 94 have even deeper indentations than those of the folding rollers of the first folding station 88. Here, the protrusions 94a are generally triangular in cross-sectional shape to as to terminate at a pointed outer tip which is sharper than the protrusions of the rollers at the preceding stations 80, 88. The rollers at this station 92 again feature axially linear protrusions and indentations The next two pairs of vertically stacked rollers, i.e. the ninth and tenth pairs, define a left hand helical roller station 96 at which the rollers 98 feature helical protrusions or ribs separated by helical grooves or indentations, with the helical paths of these elements following a left hand direction around the periphery of the roller. When the hemp stalks are conveyed through the nip of the left hand helical rollers 98, which are shown in FIG. 10, the inner core of the stem is rubbed to the left and the skin of the stalk is further separated from the stem.

Figure 11:
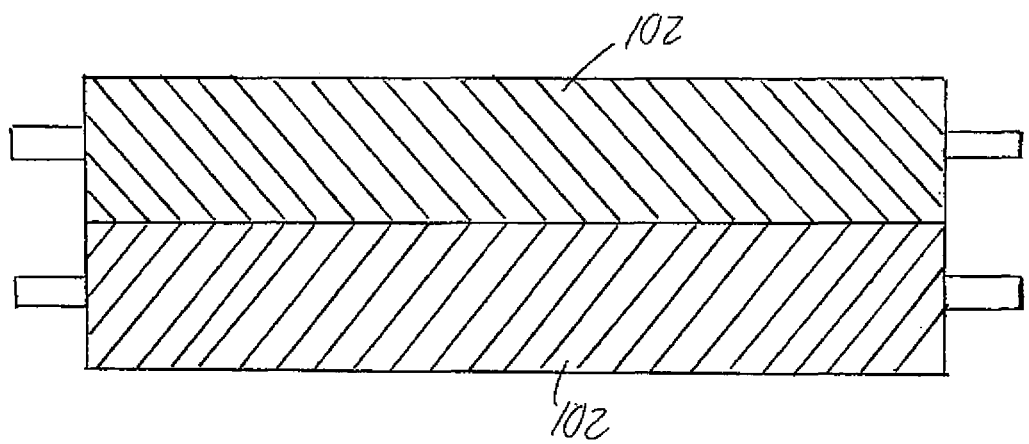
FIG. 11 is a schematic front elevational view of a second helically ribbed roller section of the separation stage of FIG. 6, which features a rib layout of opposite helical direction and is located downstream of the first helically ribbed roller section of FIG. 10.

The next two pairs of vertically stacked rollers, i.e. the eleventh and twelfth pairs, define a right hand helical roller station 100 at which the rollers 102 again feature helical protrusions or ribs separated by helical grooves indentations, but the helical paths of these elements following a right hand direction around the periphery of the roller. When the hemp stalks are conveyed through the nip of the right hand helical rollers 102, which are shown in FIG. 11, the inner core of the stem is rubbed to the right and the skin of the stalk is completely separated from the stem.

Finally, the last pair of vertically stacked rollers 104, i.e. the thirteenth pair, a spur gear pattern on each of its rollers 106, and is used to convey the stalks onward in the downstream direction 18 to the final stage of the process.

The separation stage of the process therefore employs multiple sets of counter-rotating rollers that vary in physicals characteristics of the rollers from one set to the next. While the illustrated embodiment employs three rollers at the pressing station and first folding station, two rollers at the second folding station and first helical station, and three rollers at the final helical station, each station may vary in the number of the rollers in its respective set. In addition, the order in which the left and right hand helical roller stations are placed within the separation stage may be altered.

Figure 12A:
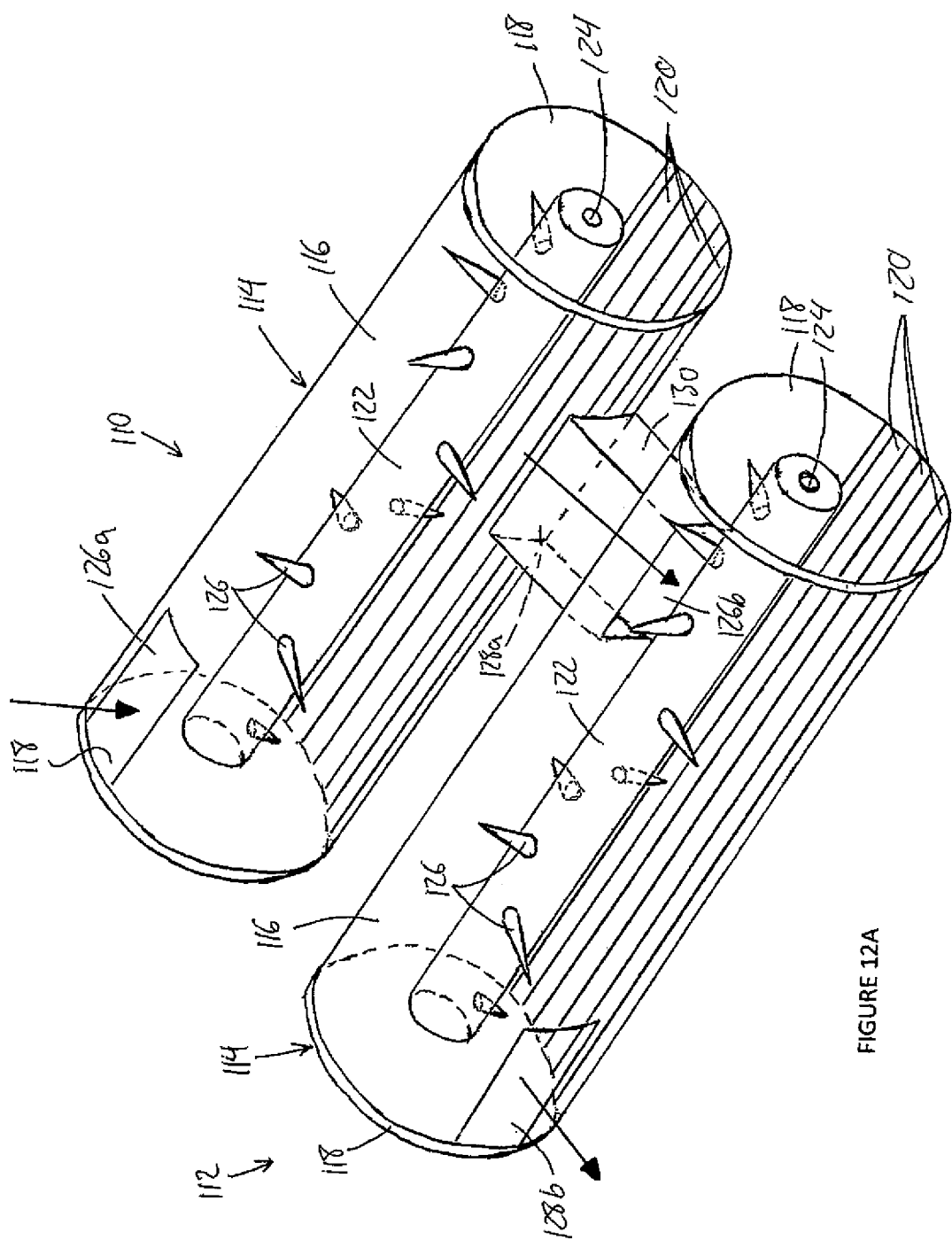
FIG. 12A is a schematic perspective view of a decortication stage of the industrial hemp processing system of the present invention, which is located downstream of the separation stage of FIG. 6 and features a pair of side by side decorticators.
Figure 12B:
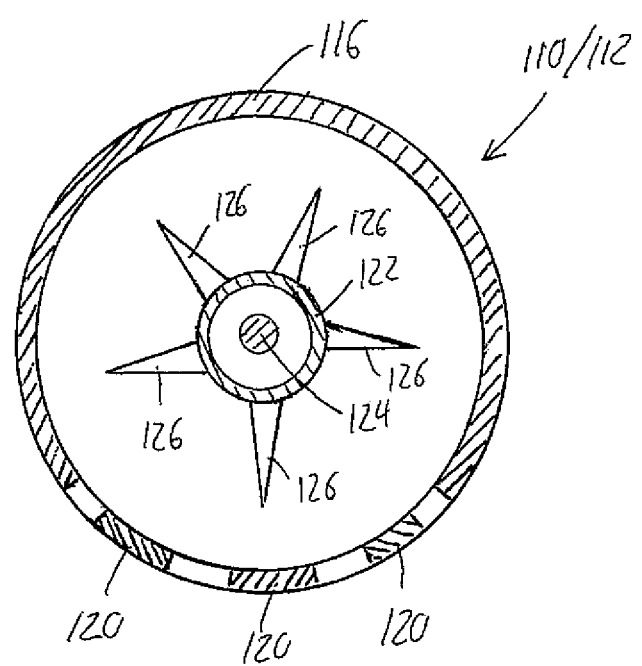
FIG. 12B is a schematic end view of the one of the decorticators of FIG. 13A.

With reference to FIG. 12, the final stage of the process is decortication stage, which employs a scattering and shaking method to complete the separation of the hemp fibers from the inner core of the processed stalks received from the preceding separation stage. The decortication stage features two decorticators 110, 112, each of which features a sealed container 114 having an arcuately curved upper cover 116 whose concave side faces downwardly to enclose over an upper half of an interior space of the container 114. A pair of circular end plates 118 are affixed to opposite ends of the curved upper 116 cover at positions centered on the longitudinal axis that defines the radial center of the arcuate curvature of the cover. The upper covers 116 and end plates 118 are shown transparently in FIG. 12A to provide visual detection of components inside the housing, but it will be appreciated that opaque materials, such as steel or other metal, may be employed for the cover.

A series of elongated bars 120 are welded or otherwise fastened to the end plates 118 at the lower halves of their outer peripheries to complete the container structure. The bars 120 lie parallel to one another in respective vertical planes parallel to the vertical plane in which the central longitudinal axis resides, and are evenly spaced apart from one another about the central longitudinal axis. The bars 120 and curved upper cover thus delimit an interior space of the container. A cylindrical drum 122 of smaller diameter than the interior space is carried on a shaft 124 that passes centrally through the drum on the central longitudinal axis. The shaft is rotatably supported on the end walls by suitable bearings (not shown), whereby the drum is rotatable inside the container on the central longitudinal axis thereof. Steel teeth 126 are welded on a helical pattern around the periphery of the cylindrical drum 122. As shown in FIG. 12A, the teeth 126 are distributed over a substantial entirety of the drum's axial length.

The container of the first decorticator features an intake opening 126a located adjacent to a first end of the container at the apex of the curved cover 116 that defines the topside of the container. Through this intake opening 126a, processed stalks from the upstream separation stage of FIG. 6 gravitationally fall into the interior space of the container; onto the rotating teeth 126 of the internal drum 122, which spin the stalks around the central longitudinal axis of the container. During this process, the stalks hit the inner wall surfaces (i.e. the internal surface of the cover 116, and the inner surfaces of the bars 120) of the container continuously. Hurds are obtained from this process, as the stalks are broken apart by repeated ongoing impact against the wall surfaces. The bars 120 are uniformly spaced to form a grate that spans across the open bottom end of the cover 116 on an arcuate path of equal radius to the cover, whereby the cover 116 and grating delimit the interior space of the container. The spacing between the bars 120 of the grating of the first decorticator is sized to accommodate the passage of the separated hurds through this space, whereby the hurds fall from the container into a collection conveyor (not illustrated) placed below the first decorticator 110.

Inside the first decorticator, the fibers from the incoming stalks rotate along the teeth at a certain angle and then fall down, and are picked by the following teeth and repeat the previous motion. The hemp stalks are continuously picked up by the teeth, spun, impacted against the inner wall and allowed to fall down. Hemp hurds are obtained through the continuously repeated motions. The space between the bars of the grating at the bottom of the container is insufficient to accommodate passage of the hemp fibers therethrough, whereby the grating acts as a filter to allow the hemp hurds to fall to the underlying collection conveyor, while preventing the remaining hemp fibres from falling through. Thus, fibers and hurds are completely separated.

A fiber outlet 128a is provided on the first decorticator 110 in the form of an opening in the side of the curved cover 116, specifically the side thereof that faces toward the second decorticator 112, whose container is oriented parallel to and alongside that of the first decorticator 110. As shown in FIG. 12A, this fiber outlet 128a spans less than a majority of the containers axial length and resides at a location situated between a midpoint of the container's axial length and the second end of the container, and is thus situated near the second end of the first decorticator so as to reside distally to the intake opening 126b along the axial direction of the decorticator. The second decorticator 110 features an intake opening 126b which is situated at the side of its curved cover 116 that faces toward the first decorticator, rather than at the top of the cover. The intake 126b of the second decorticator 112 is therefore positioned in general alignment with the fiber outlet 128 of the first decorticator, and a transfer conduit 130, for example in the form of a duct or chute, joins the intake 126b of the second decorticator 112 with the fiber outlet 128 of the first decorticator. The fibers from the first decorticator; being prevented from falling gravitationally through the grater-filtered hurd outlet at the underside of the first decorticator, thus transfers into the container of the second decorticator via this transfer conduit 130. Air flow om a motor (not shown) operating the rotating drum 122 of the first decorticator may be used to encourage conveyance of the fibers through the transfer conduit 130 from the first decorticator to the second decorticator.

The second decorticator again features a grate-filtered outlet at the underside of the container, but the filter differs in the spacing of its bars, which allows passage of short hemp fibers therethrough, but not longer hemp fibers. The short fibers thus fall gravitationally from the underside of the container onto a second short-fiber collecting conveyor (not shown) placed beneath the second decorticator. The long fibers are instead conveyed axially along the second container away from the transfer conduit 130 toward the second decorticator's fiber outlet 128*b* by the helically arranged teeth 126 of the rotating drum 122. The fiber outlet 128*b* of the second decorticator ejects the longer fibers from the second decorticator onto a third long-fiber collection conveyor (not shown) situated below this outlet on the side of the second decorticator facing away from the first decorticator. As shown in FIG. 12A, and just like in the first decorticator, the teeth 126 in the second decorticator are distributed over a substantial entirety of the drum's axial length, and fiber outlet spans only minority of the container's axial length at a location situated between the midpoint of the container's axial length and the second end of the container furthest from the inlet 126*b*.

For ease of illustration, the drawing shows each decorticator as having a cylindrically contoured upper cover 116 with two end plates 118 of equal size, which may be true of one embodiment. However, in preferred embodiments, the container deviates from a truly cylindrical shape, instead being of smaller diameter at the intake end of the container than at the outlet end thereof. In one particular embodiment, the container is 3-meters long, 1-meter in diameter at the intake end and 1.4-meters in diameter at the outlet end, while the filter bars are parallel to one another.

The entire process disclosed above (from the initial bale opening stage, through the subsequent roller-based separation stage, and through the final decortication stage may be operated continuously, and on an automated basis, for effective and efficient production of hemp products, including hurds and one or more different classes of hemp fiber. Although described herein particularly for the processing of hemp, the system, or stages or components thereof, may alternatively be applicable for the processing of other crops that require breaking down of bales and/or extraction of fibers and/or hurds therefrom.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A system for processing fibrous crop material, the system comprising a roller-based material separation stage for separating fibers from stalks of fibrous crop material, the roller-based material separation stage comprising at least one set of vertically-stacked counter-rotating rollers, each set of vertically-stacked counter-rotating rollers comprising at least one respective pair of vertically-stacked counter-rotating rollers having a nip therebetween through which stalk material is conveyed, wherein said system is further characterized by a decortication stage that is situated downstream of the roller-based material separation stage and comprises:
at least one decorticator comprising:
an external container having an inlet end, an axially opposing outlet end, a respective end wall at each of said ends, an axial container length measured between said respective end walls, and an upper cover having an arcuate shape and spanning between said respective ends walls with a concave side of said arcuate shape facing downwardly;
a singular internal drum rotatably supported within the external container in a position centered beneath the upper cover on a central longitudinal axis of the container that defines a radial center of the arcuate shape of said upper cover, said drum being coupled to a drive source for driven rotation of the internal drum about said central longitudinal axis, said drum having an axial drum length that is measured parallel to the axial container length and spans from the respective end wall at the inlet end of the container to the respective end wall at the outlet end of the container, and said singular drum being the only such drum inside said external container;
an array of teeth mounted to a periphery of the drum and laid out in helical pattern therearound, said array of teeth being distributed over an entirety of said axial drum length of the internal drum; and
an intake opening on the external container adjacent the input end thereof to accommodate receipt of fibrous stalks within a hollow interior of the external container;
a fiber outlet on the external container that spans less than a majority of said axial container length, with an entirety of said fiber outlet residing between a midpoint of the axial container length and the output end of the container, and therefore residing in distal relation to the intake opening and within the axial length of the drum, whereby driven rotation of the internal drum and the array of teeth thereon is operable to both (a) spin the fibrous stalks around the internal drum and impacts the fibrous stalks against surrounding interior wall surfaces of the external container, and (b) convey fibers of said fibrous stalks axially along the container toward the fiber outlet thereof for ejection of said fibers from the container through said fiber outlet.

2. The system of claim 1 wherein said decorticator further comprises:
a hurd outlet comprising:
a bottom opening provided in an underside of the external container at a position underlying the central longitudinal axis of the internal drum; and
a filter grating spanning across the bottom opening in the underside of the container on an arcuate path about said central longitudinal axis at a position directly thereunder, said filter grating having open spaces therein that are sized to allow separated hurds from said fibrous stalks to fall through said open spaces, while prohibiting the fibers of said fibrous stalks from falling through said open spaces.

3. The system of claim 1 wherein all teeth on the drum reside on a same helical path as one another around said drum.

4. A system for processing fibrous crop material, the system comprising a decortication stage which comprises:
at least one decorticator comprising:

an external container having an inlet end, an axially opposing outlet end, a respective end wall at each of said ends, an axial container length measured between said respective end walls, and an upper cover having an arcuate shape and spanning between said respective ends walls with a concave side of said arcuate shape facing downwardly;

a singular internal drum rotatably supported within the external container in a position centered beneath the upper cover on a central longitudinal axis of the container that defines a radial center of the arcuate shape of said upper cover, said drum being coupled to a drive source for driven rotation of the internal drum about said central longitudinal axis thereof, said drum having an axial drum length that is measured parallel to the axial container length and spans from the respective end wall at the inlet end of the container to the respective end wall at the outlet end of the container, and said singular internal drum being the only such drum inside said external container;

an array of teeth mounted to a periphery of the drum; and an intake opening on the external container to accommodate receipt of fibrous stalks or fibers thereof within a hollow interior of the external container, whereupon driven rotation of the internal drum and the array of teeth thereon spins the fibrous stalks or fibers thereof around the internal drum;

wherein:

the at least one decorticator comprises first and second decorticators;

the external container of the first decorticator comprises a hurd outlet and a first filter that is configured to allow hurds to exit the external container of the first decorticator through the hurd outlet while preventing fibers from exiting therethrough; and the external container of the first decorticator has a separate fiber outlet that feeds into the intake opening of the second decorticator to transfer fibers of the fibrous stalks to the second decorticator, said fiber outlet spanning less than a majority of said axial container length of the first decorticator, with an entirety of said fiber outlet being located between a midpoint of the axial container length of the first decorticator and the output end thereof and within the axial length of the drum;

the intake opening and the fiber outlet of the first decorticator reside respectively adjacent the axially opposing input and output ends of the external container of said first decorticator, and the array of teeth on the drum of said first decorticator are laid out in a helical pattern therearound and are distributed over an entirety of the axial drum length of the first decorticator such that the fibers are conveyed axially along the container of said first decorticator toward the fiber outlet thereof for ejection of said fibers through said fiber outlet; and the input end of said second decorticator resides nearest to the output end of said first decorticator, and the intake opening on the external container of the second decorticator resides adjacent the input end thereof and faces and aligns with the fiber outlet of the first decorticator to receive the ejected fibers therefrom.

5. The system of claim 4 wherein all teeth on the drum reside on a same helical path as one another around said drum.

6. The system of claim 4 wherein the hurd outlet is at an underside of the external container of the first decorticator, the separate fiber outlet is located at a side thereof, and the intake opening of the external container of the second decorticator is located at a side thereof.

7. The system of 6 wherein the external container of the second decorticator comprises:
   a short fiber outlet and a second filter that is configured to allow short fibers to exit the external container of the second decorticator through the short fiber outlet while preventing long fibers from exiting therethrough; and
   a separate long fiber outlet that spans less than a majority of said axial container length of the second decorticator, with an entirety of said long fiber outlet being and located between a midpoint of the axial container length of the second decorticator and the output end thereof, and thus residing adjacent the output end of the second decorticator and within the axial length of the drum of the second decorticator, and through which the long fibers exit the external container of the second decorticator;
   wherein the array of teeth on the drum of said second decorticator are laid out in a helical pattern therearound and are distributed over an entirety of said axial drum length of the internal drum, such that the long fibers are conveyed axially along the container of said second decorticator toward the long fiber outlet thereof for ejection of said long fibers through said long fiber outlet.

8. The system of claim 4 wherein each filter comprises a grating.

9. The system of claim 8 wherein the grating comprises a series of bars welded to end walls of the respective external container and lying parallel to one another along the central longitudinal axis of the respective internal drum.

10. The system of claim 4 further comprising a duct or chute joining the fiber outlet of the first decorticator with the inlet of the second decorticator.

11. The system of claim 4 wherein:
   the hurd outlet of the first decorticator comprises a bottom opening provided in an underside of the external container of said first decorticator at a position underlying the central longitudinal axis of the internal drum of said first decorticator; and
   the first filter comprises a grating spanning across the bottom opening in the underside of the container of said first decorticator on an arcuate path about said central longitudinal axis at a position directly therebelow, said grating having open spaces therein that are sized to allow the hurds to fall through said open spaces, while prohibiting the fibers of said fibrous stalks from falling through said open spaces.

12. The system of claim 11 wherein:
   the external container of the second decorticator comprises:
   a short fiber outlet and a second filter that is configured to allow short fibers to exit the external container of the second decorticator through the short fiber outlet while preventing long fibers from exiting therethrough; and
   a separate long fiber outlet that resides adjacent the output end of the second decorticator and through which the long fibers exit the external container of the second decorticator, said long fiber outlet spanning less than a majority of the axial container length of the second decorticator, with an entirety of said long fiber outlet being located between a midpoint of the axial container length of the second decorticator and the output end thereof and within the axial length of the drum of the second decorticator;

the array of teeth on the drum of said second decorticator are laid out in a helical pattern therearound and are distributed over an entirety of the axial drum length of the second decorticator, such that the long fibers are conveyed axially along the container of said second decorticator toward the long fiber outlet thereof for ejection of said long fibers through said long fiber outlet;

the short fiber outlet of the second decorticator comprises a bottom opening provided in an underside of the external container of said second decorticator at a position underlying the central longitudinal axis of the internal drum of said second decorticator; and the second filter comprises a second grating spanning across the bottom opening in the underside of the container of said second decorticator on an arcuate path about said central longitudinal axis of the internal drum of said second decorticator at a position directly below said central longitudinal axis of the internal drum of said second decorticator, said second grating having open spaces therein that are sized differently than the open spaces in the first grating, and are sized to allow the short fibers to fall through said open spaces, while prohibiting the long fibers from falling through said open spaces.

13. A decorticator for processing fibrous crop material, said decorticator comprising:

an external container having an inlet end, an axially opposing outlet end, a respective end wall at each of said ends, an axial container length measured between said respective end walls, and an upper cover having an arcuate shape and spanning between said respective ends walls with a concave side of said arcuate shape facing downwardly;

a singular internal drum rotatably supported within the external container in a position centered beneath the upper cover on a central longitudinal axis of the container that defines a radial center of the arcuate shape of said upper cover, said drum being coupled to a drive source for driven rotation of the internal drum about said central longitudinal axis thereof, said drum having an axial drum length that is measured parallel to the axial container length and spans from the respective end wall at the inlet end of the container to the respective end wall at the outlet end of the container, and said singular internal drum being the only such drum inside said external container;

an array of teeth mounted to a periphery of the drum and laid out in helical pattern therearound, said array of teeth being distributed over an entirety of said axial drum length of the internal drum; and an intake opening on the external container adjacent the input end thereof to accommodate receipt of fibrous crop material within a hollow interior of the external container;

a fiber outlet on the external container that spans less than a majority of said axial container length, with an entirety of said fiber outlet residing between a midpoint of the axial container length and the output end of the container, and therefore residing in distal relation to the intake opening and within the axial length of the drum, whereby driven rotation of the internal drum and the array of teeth thereon is operable to both (a) spin the fibrous crop material around the internal drum, and (b) convey fibers of said fibrous crop material axially along the container toward the fiber outlet thereof for ejection of said fibers from the container through said fiber outlet; and an additional outlet comprising:

a bottom opening provided in an underside of the external container at a position underlying the central longitudinal axis of the internal drum;

a filter grating spanning across the bottom opening in the underside of the container on an arcuate path about said central longitudinal axis at a position directly therebelow, said filter grating having open spaces therein that are sized to prohibit the fibers of said fibrous crop material from falling through said open spaces, while allowing other separated materials from said fibrous crop material to fall through said open spaces.

14. The decorticator of claim 13 wherein all teeth on the drum reside on a same helical path as one another around said drum.

* * * * *